(12) United States Patent
Jecker et al.

(10) Patent No.: US 9,789,904 B2
(45) Date of Patent: Oct. 17, 2017

(54) REMOTE-CONTROLLED MANEUVERING OF A MOTOR VEHICLE WITH THE AID OF A PORTABLE COMMUNICATION DEVICE

(71) Applicant: VALEO Schalter und Sensoren GmbH, Bietigheim-Bissingen (DE)

(72) Inventors: Nicolas Jecker, Esslingen (DE); Oliver Grimm, Flein (DE); Vsevolod Vovkushevsky, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/394,898

(22) PCT Filed: Apr. 10, 2013

(86) PCT No.: PCT/EP2013/057450
§ 371 (c)(1),
(2) Date: Oct. 16, 2014

(87) PCT Pub. No.: WO2013/156361
PCT Pub. Date: Oct. 24, 2013

(65) Prior Publication Data
US 2015/0127208 A1    May 7, 2015

(30) Foreign Application Priority Data
Apr. 20, 2012  (DE) .................. 10 2012 007 986

(51) Int. Cl.
*B62D 15/02*    (2006.01)
(52) U.S. Cl.
CPC ....... *B62D 15/025* (2013.01); *B62D 15/0285* (2013.01)
(58) Field of Classification Search
CPC .................... H04W 4/023; G05D 2201/0209
See application file for complete search history.

(56) References Cited

U.S. PATENT DOCUMENTS 5,979,586 A * 11/1999 Farmer ................. B60Q 9/008
                                                          180/169
2006/0001532 A1    1/2006 Nagata
(Continued)

FOREIGN PATENT DOCUMENTS

CN         1787943 A      6/2006
CN       101146707 A      3/2008
(Continued)

OTHER PUBLICATIONS

International Search Report for corresponding International Application No. PCT/EP2013/057450, mailed Jul. 18, 2013 (2 pages).
(Continued)

*Primary Examiner* — Todd Melton
*Assistant Examiner* — Jason Roberson
(74) *Attorney, Agent, or Firm* — Osha Liang LLP

(57) ABSTRACT

The invention relates to a maneuvering system (2) for the automated maneuvering of a motor vehicle (1), including an on-board control device (3) which is designed to provide control signals (S) to a drive device and/or steering device (5) of the motor vehicle (1) and thereby to carry out a maneuvering operation of the motor vehicle (1) automatically, and including a portable communication device (4) which is operable by a user, which is designed to communicate wirelessly with the on-board control device (3) and thereby to enable and/or interrupt the maneuvering operation as a function of an input by the user at an operating device (8) of the portable communication device (4). The on-board control device (3) is designed to transmit messages (10) to the portable communication device (4) with respect to the maneuvering operation as part of the wireless communication, and the portable communication device (4) designed to output an acoustic information signal (13, 20) by means of a loudspeaker (11, 19) and/or a haptic information signal
(Continued)

(14) by means of a haptic device (12) including information about the maneuvering operation, as a function of the received messages (10).

10 Claims, 1 Drawing Sheet

(56) References Cited

U.S. PATENT DOCUMENTS

| | | | | |
|---|---|---|---|---|
| 2010/0045452 | A1* | 2/2010 | Periwal | B60Q 9/00 340/439 |
| 2010/0085238 | A1* | 4/2010 | Muller-Frahm | G01S 11/12 342/70 |
| 2010/0292923 | A1* | 11/2010 | Zhang | G01S 13/93 701/431 |
| 2012/0188100 | A1* | 7/2012 | Min | G08G 1/143 340/932.2 |

FOREIGN PATENT DOCUMENTS

| | | |
|---|---|---|
| CN | 201932070 U | 8/2011 |
| DE | 198 17 142 B4 | 10/1999 |
| DE | 10 2005 034 277 A1 | 2/2007 |
| DE | 10 2006 026 092 A1 | 12/2007 |
| DE | 102008051982 A1 | 6/2009 |
| DE | 20 2009 005 524 U1 | 8/2009 |
| DE | 10 2009 041 587 A1 | 3/2011 |
| DE | 20 2008 018 157 U1 | 3/2012 |
| EP | 1 826 107 A2 | 8/2007 |
| JP | H09062999 A | 7/1997 |
| JP | 2002041146 A | 2/2002 |
| JP | 2006019908 A | 1/2006 |
| JP | 2006-69534 A | 3/2006 |
| JP | 2006-302187 A | 11/2006 |
| JP | 2008033438 A | 2/2008 |

OTHER PUBLICATIONS

Search Report for corresponding German Application No. 10 2012 007 986.9, mailed Dec. 10, 2012 (6 pages).
Office Action issued in counterpart Chinese Patent Application No. 201380020819.8, dated Dec. 31, 2015 (19 pages).
Second Office Action issued in counterpart Chinese Patent Application No. 201380020819.8, dated Sep. 12, 2016 (22 pages).
Office Action issued in counterpart Japanese Patent Application No. 2015-506184, dated Sep. 29, 2015 (8 pages).
Search Report issued in counterpart German Patent Application No. 13717238.3, dated Oct. 12, 2015 (10 pages).

* cited by examiner

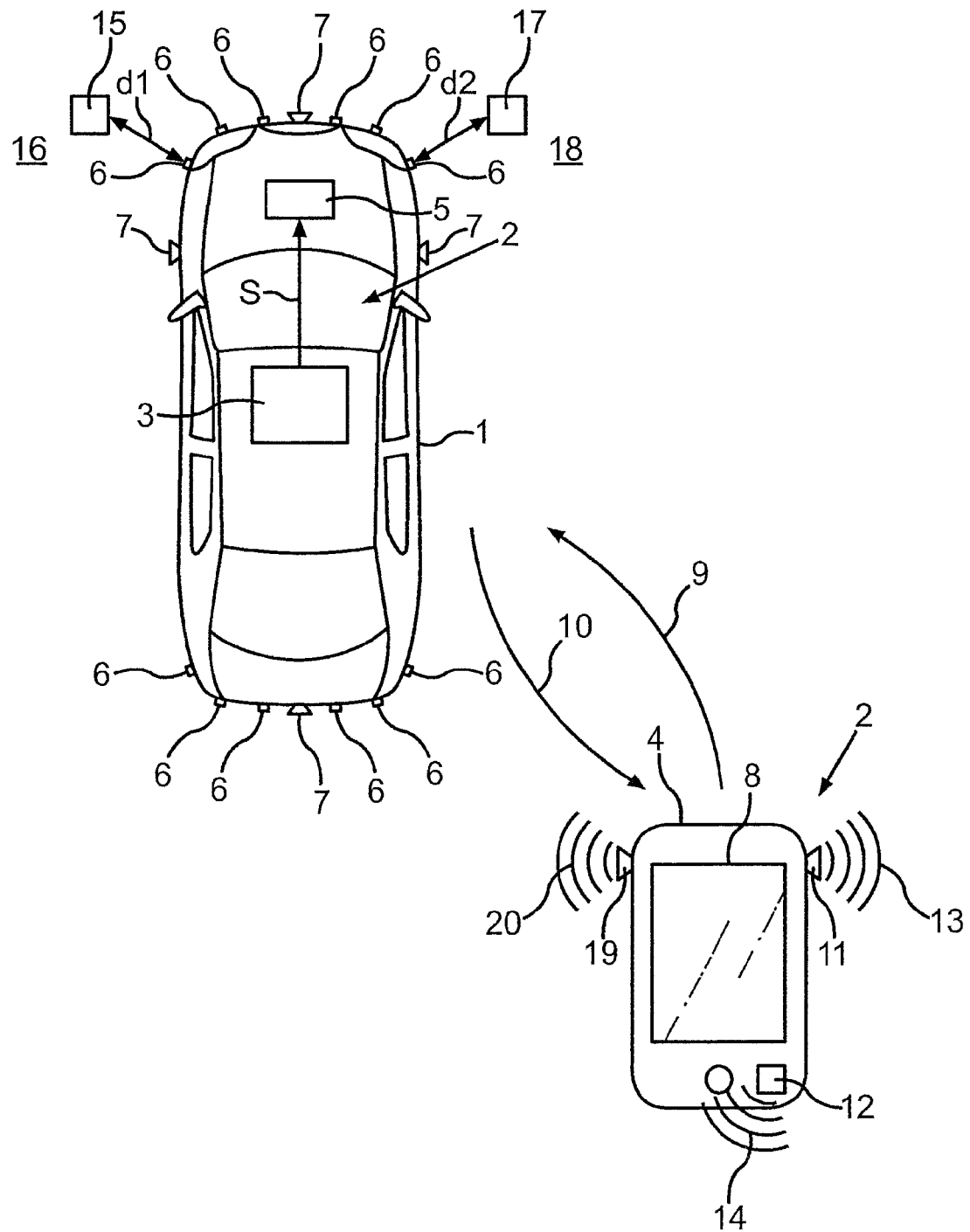

REMOTE-CONTROLLED MANEUVERING OF A MOTOR VEHICLE WITH THE AID OF A PORTABLE COMMUNICATION DEVICE

The present invention relates to a manoeuvring system for the automated manoeuvring of a motor vehicle. The manoeuvring system includes an on-board control device which is designed to provide control signals to a drive device and/or steering device of the motor vehicle and thereby to carry out a manoeuvring operation of the motor vehicle automatically. The manoeuvring system also includes a portable communication device which is operable by a user, in particular the driver of the motor vehicle, which communicates wirelessly with the on-board control device and may thereby enable and/or interrupt the automated manoeuvring operation as a function of an input by the user at an operating device of the portable communication device. In addition, the present invention relates to a motor vehicle including such a manoeuvring system, a portable communication device and a method for the automatic manoeuvring of a motor vehicle.

Interest is presently directed in particular to an automatic parking assistance system which is designed for the autonomous or automatic parking of a motor vehicle in a parking space. Such parking assistance systems are already known in the prior art. Such a system is, for example, known from publication DE 198 17 142 B4. Here, the parking assistance system is able to carry out the parking operation of the motor vehicle automatically, without requiring the driver to steer or accelerate. With the aid of ultrasound sensors, the parking assistance system initially detects an available parking space in the surroundings of the motor vehicle which is suitable for parking the motor vehicle or has corresponding dimensions in both the longitudinal direction and the transverse direction of the motor vehicle. The parking assistance system then determines the relative position of the motor vehicle with respect to the parking space, and a parking path is subsequently calculated, along which the motor vehicle may be parked in a final position in the parking space. The driver needs only to enable the automatic parking operation. The driver may do this with the aid of an operating device, and also has the option of interrupting the autonomous parking operation. For this purpose, a remote control is also provided which, for example, is also designed in the form of a vehicle key.

A driver assistance device for a motor vehicle is known from DE 10 2009 041 587 A1 which is designed for carrying out an automatic parking operation. A remote control is also provided which is integrated into a vehicle key or may be designed in the form of a mobile telephone. The automatic parking operation may be initiated and then also interrupted as necessary with the aid of the remote control. In addition, a plurality of cameras is situated on the motor vehicle which detect the surroundings around the motor vehicle. The recorded images may also be transmitted to the remote control, and the remote control includes a display on which the recorded images or images calculated from them may be displayed. It is thus possible to monitor the automatic parking operation with the aid of the displayed images, since all relevant information is displayed to the driver on the display of the remote control.

Thus, for controlling the automatic parking operation of a motor vehicle, it is already known in prior art to use a mobile telephone such as a smartphone, which is now available on the market in a variety of designs. It is already known to allow automatic manoeuvring of the motor vehicle only as long as the user keeps an operating element such as button on a touch-sensitive display actuated, and to stop the motor vehicle immediately after releasing this operating element. For this purpose, a special application or a program may be installed on the mobile telephone which is designed in such a way that the safety requirements are met, i.e., that the motor vehicle is moved only if the user keeps a corresponding operating element actuated, and is automatically stopped if the user releases this operating element. Thus, the driver may interrupt the automatic parking operation in an especially rapid manner, i.e., by simply releasing the operating element. One particular challenge is then to convey all relevant information about the parking operation to the user or the driver, so that the driver is also able to make a reliable decision whether or not the parking operation is to be interrupted. In this regard, systems are already known which are able to brake the motor vehicle automatically after detecting an obstacle. However, the driver often does not know why the motor vehicle has been brought to a stop and where the obstacle is actually located. The approach which is already known from the prior art of displaying images of the surrounding area of the motor vehicle on a display of the mobile telephone provides a certain amount of assistance in this regard, but generally proves to be advantageous primarily under good lighting conditions.

The object of the present invention is to demonstrate a solution to enable particularly safe automated manoeuvring of a motor vehicle with the aid of a portable communication device.

This object is achieved by a manoeuvring system, by a motor vehicle, by a portable communication device and by a method having the features according to the respective independent patent claims. Advantageous embodiments of the present invention are the subject matter of the dependent patent claims, the description and the FIGURE.

A manoeuvring system according to the present invention is designed for the automated manoeuvring, in particular for the automatic parking, of a motor vehicle. On the one hand, the manoeuvring system includes an on-board control device, and on the other hand, a portable communication device which may be operated by a user, in particular the driver. The control device may provide control signals to a drive device and/or steering device of the motor vehicle and thus automatically carry out a manoeuvring operation of the motor vehicle. The portable communication device may communicate wirelessly with the on-board control device and thus enable or interrupt the manoeuvring operation, i.e., as a function of an input by the user at an operating device of the portable communication device. The portable communication device is thus a mobile remote control by means of which the driver may enable and/or interrupt the automatic manoeuvring operation. The on-board control device may transmit messages to the portable communication device with respect to the manoeuvring operation as part of the wireless communication. The portable communication device receives the messages and, as a function of these messages, outputs an acoustic information signal including information about the manoeuvring operation and/or a haptic information signal including information about the manoeuvring operation, i.e., with the aid of a loudspeaker or a haptic device.

The effect according to the present invention is thus achieved by a portable communication device such as a smartphone or a vehicle key being used as an operating device for controlling the automatic manoeuvring operation, which is equipped for this purpose with a specific operating application, and which communicates wirelessly with the on-board control device, for example, via a WLAN data connection and/or a Bluetooth data connection, and by the aforementioned operating application being designed in such a way that the portable communication device may receive messages (i.e., data) from the on-board control device with respect to the manoeuvring operation of the motor vehicle and may activate its loudspeaker and/or its haptic device as a function of these received messages in order to output an acoustic and/or haptic information signal including information about the automatic manoeuvring operation. In this way, particularly safe manoeuvring of the motor vehicle is made possible. That is to say, all safety-related information with respect to the manoeuvring operation may be transmitted to the portable communication device and output acoustically and/or haptically there, so that the user is informed of the possibly existing hazards by the portable communication device. For example, with the aid of the acoustic and/or haptic information signal, the user may be informed of distances which are measured between the motor vehicle on the one hand and the obstacles located in its surroundings on the other hand with the aid of a sensor device of the motor vehicle. Thus, the user is able to estimate, particularly well and regardless of the prevailing light conditions, whether or not he/she possibly has to interrupt the automatic manoeuvring operation.

In principle, the portable communication device may be any remote control, such as a vehicle key or another communication device. However, it proves to be particularly advantageous if the portable communication device is designed as a mobile telephone, for example, a smartphone. That is to say, the known mobile telephones have sufficient calculating resources, so that new applications or computer programs may be installed without a problem, which makes possible the functionality of the manoeuvring system according to the present invention. Thus, a mobile telephone which is generally available in any case may be used for operating the manoeuvring system, so that the use of additional components having the associated disadvantages with respect to expense is unnecessary. In addition, today, the known mobile telephones generally have touch displays, which may be designed with regard to the operation of the manoeuvring system in any manner using switching ranges or pushbuttons. Not least, the mobile telephones available on the market also have a loudspeaker and a haptic device (such as an actuator or vibrator), so that the most important information may be conveyed to the driver by acoustic and/or haptic means.

The functionality of the remote control of the automatic manoeuvring operation may be provided by installing an application or a computer program developed particularly for this purpose on the portable communication device. Such a computer program may be delivered on a data carrier along with the motor vehicle and/or provided on an Internet server and made available for downloading. It may be provided that the communication device must be logged on to the motor vehicle before the remote control is possible. For this purpose, a non-public code which is associated with the vehicle may be entered once in the application, for example, a PIN number included in the operating manual of the motor vehicle or the like. Communication between the portable communication device and the on-board control device is enabled only subsequently. Unauthorized third parties are thus prevented from being able to control the motor vehicle.

The manoeuvring system is preferably a parking assistance system which is designed for the autonomous parking of the motor vehicle in a parking space or for carrying out automatic parking operations as manoeuvring operations. Such a parking assistance system may include a sensor device which, for example, includes a plurality of ultrasound sensors attached to the bumpers. The parking assistance system may detect a suitable parking space based on sensor data of the sensor device and calculate a parking path as a function of a current relative position of the motor vehicle with respect to the parking space, along which the motor vehicle may be moved into a final position in the parking space. The parking assistance system automatically actuates the drive device and/or steering device of the motor vehicle in order to move the motor vehicle into the parking space, i.e., according to the calculated parking path. The driver must merely enable the automatic parking operation and may interrupt this parking operation at any time if necessary.

The manoeuvring system preferably includes an on-board sensor device which is designed to detect a distance between the motor vehicle on the one hand and an obstacle located in a surrounding area of the motor vehicle on the other hand. The control device may be designed to generate the messages for the portable communication device based on, or as a function of, the detected distance, and the information signal which is output by the portable communication device may be a signal which is a function of the distance. In particular, the repetition frequency or repetition rate of the information signal, i.e., of the acoustic information signal and/or the haptic information signal, is a function of the measured distance between the motor vehicle and the obstacle. The information (included in the information signal) which is output by the portable communication device thus includes a piece of information about the measured distance, so that the driver or the user may be informed of the actual distance from the obstacle by haptic and/or by acoustic means. Similarly to a conventional parking assistant of a motor vehicle, this may be such that an acoustic information signal is output in the form of a warning beep whose frequency or repetition rate changes with the distance. In particular, this repetition frequency increases as the measured distance decreases. It is also conceivable that this acoustic warning via the portable communication device behaves differently than the known parking assistants which are situated in the interior of the motor vehicle. For example, the warning via the portable communication device may take place comparatively later in order not to annoy the user unnecessarily with acoustic signals. On the whole, the user may be particularly reliability informed of the measured distance with the aid of the acoustic and/or haptic information signal, and may thus interrupt the automatic manoeuvring operation within a very short time if necessary, in particular without having to continuously monitor the images of the vehicle surroundings which are possibly displayed on the display of the portable communication device. This may also, for example, be carried out via voice signals, so that the measured distance is spoken acoustically by the portable communication device.

It may also be provided that the sensor device of the motor vehicle is also able to detect multiple obstacles simultaneously and is able to measure the respective distances between the motor vehicle and the respective obstacles. In one specific embodiment, it is provided that the sensor device detects distances between the motor vehicle and obstacles located in the surrounding areas, for at least two different surrounding areas of the motor vehicle. For example, the sensor device may have a plurality of sensors, in particular ultrasound sensors, each of which covers a different surrounding area of the motor vehicle. The portable communication device may then output different information signals, in particular information signals having different frequencies (signal pitch), for the at least two different surrounding areas of the motor vehicle. In particular, it is provided that the portable communication device is able to output different information signals of the same type, i.e., different acoustic information signals and/or different haptic information signals, for the at least two different surrounding areas of the motor vehicle. For example, the sound output for the areas in front of the motor vehicle, behind the motor vehicle, and on the side of the motor vehicle may be generated by sounds having different frequencies. Thus, the information signal which is output informs the user of the surrounding area of the motor vehicle in which the obstacle is located.

If multiple obstacles are detected by the sensor device, it may be provided that the portable communication device outputs the information signal for that obstacle with respect to which an ascertained degree of danger is the greatest, in particular the obstacle which is closest to the motor vehicle and/or with respect to which an ascertained time until collision is the shortest. This specific embodiment is advantageous in particular for those portable communication devices which have only one loudspeaker. Thus, that obstacle is selected which poses the greatest hazard to the motor vehicle. The degree of danger may be directly related to the direct distance between the motor vehicle and the obstacle and/or to the so-called time to collision or the distance to collision. The distance to collision is the actual path length which the motor vehicle must cover, taking into consideration the steering angle and the anticipated trajectory, in order to reach the obstacle or to collide with the obstacle.

In one specific embodiment, it is provided that the portable communication device includes a stereo loudspeaker system including at least a first and a second loudspeaker, and the sensor device detects distances between the motor vehicle on the one hand and obstacles located in the surrounding areas on the other hand, for at least a first and a second surrounding area of the motor vehicle. The portable communication device may then be configured in such a way that an acoustic information signal is output via the first loudspeaker if an obstacle is present in the first surrounding area, and an acoustic information signal is output via the second loudspeaker if an obstacle is present in the second surrounding area. Thus, directional acoustic information signals may be output via the portable communication device which also inform the user of the surrounding area in which the detected obstacle is actually located. This may be such that an acoustic information signal is perceived from the left if an obstacle is present in a surrounding area on the left next to the motor vehicle, while an acoustic information signal is perceived from the right side if an obstacle is detected in the surrounding area on the right next to the motor vehicle. Thus, the user may also be reliably informed of the position of the obstacle relative to the motor vehicle.

In one specific embodiment, it is provided that the acoustic and/or the haptic information signal is output via the portable communication device at, in particular shortly before, the start of the manoeuvring operation, in particular, even before any movement of the motor vehicle from a standstill during the manoeuvring operation. This then constitutes a piece of information for the user about the imminent start of the manoeuvring operation. The driver may thus be prepared for this action without being suddenly surprised by the automatic start of the motor vehicle. This also increases operating comfort.

It is also preferred if the portable communication device outputs the acoustic and/or the haptic information signal when braking the motor vehicle, i.e., in particular simultaneously with braking or shortly before braking, in order to inform the driver of the braking of the motor vehicle. For example, if the system decides to brake the motor vehicle, whether it is because of an unexpected obstacle, or whether it is at the end of a parking queue, or whether it is even upon reaching a final position in the parking space, the acoustic information signal and/or the haptic vibration signal or a vibration pulse may thus be generated. In this position, a haptic vibration pulse in particular proves to be advantageous. The vibration pulse which is output when braking the motor vehicle may be different from a vibration pulse which is generated when moving the motor vehicle from a standstill. Generally speaking, the information signal (acoustic and/or haptic) when starting the motor vehicle may be a different information signal than the information signal which is output when braking the motor vehicle. It is also possible that during one of these operations (starting or braking), an acoustic information signal is output, while a haptic information signal is generated during the other operation. Thus, the user is clearly informed of the particular operation, and confusion is eliminated. If a haptic and/or acoustic information signal is output when braking the motor vehicle, this has the advantage that the driver is thereby provided with the certainty that an obstacle toward which the motor vehicle is moving has been detected by the system, and the system is also able to respond to it in a timely manner.

It is advantageous if the acoustic information signal includes a speech signal including information about the manoeuvring operation. The acoustic information signal may thus also be formed by a speaking voice, via which the user is expressly informed of the particular hazards, i.e., due to obstacles, in the manner in which it is already known in navigation systems using speech signals. This maximizes convenience when monitoring the automated manoeuvring operation, and the user is informed of all relevant hazards without having to look at the portable communication device. For example, a piece of information about the remaining distance and/or about the remaining time until a final position in the parking space is reached may be output via the speech signal. In addition or alternatively, the remaining distance from an obstacle and/or the time until collision may also be output in the form of speech signals.

The logic relating to the acoustic and/or haptic information signal is preferably implemented in the on-board control device, while the portable communication device preferably receives only control commands from the control device to output a corresponding acoustic and/or haptic information signal. In this specific embodiment, the determination of the acoustic and/or haptic information signal to be output via the portable communication device is carried out by the on-board control device itself, which then transmits a control command to the portable communication device, via which the portable communication device is triggered to output the determined acoustic and/or haptic information signal. Thus, the computing effort in the portable communication device is reduced to a minimum, so that even portable communication devices having low computing power or having relatively little memory may be used. That is to say, most of the computing effort is shifted to the on-board control device, which generally has comparatively high computing power in any case.

The manoeuvring system may also include at least one camera situated in or on the motor vehicle, and image data recorded by the camera and/or resulting image data obtained via image processing may be transmitted to the portable communication device. The portable communication device may then display real-time images on its display, i.e., in particular on a touch-sensitive display, which are based on the received image data of the at least one camera. In this way, the operating person is supported when monitoring the automatic manoeuvring operation in such a way that real-time images of at least one surrounding area of the motor vehicle are displayed on the display of the portable or mobile communication device. The user is thus able to see the objects or obstacles located in the surrounding area of the motor vehicle and then interrupt the automatic manoeuvring operation if necessary, if a collision is imminent. In particular, the manoeuvring system includes a plurality of cameras, at least two cameras, which are attached in and/or on the motor vehicle and in particular detect the entire surrounding area or the entire surroundings around the motor vehicle.

A camera is presently in particular to be understood to be a video camera or an image acquisition device which is able to detect light in the spectral range which is perceptible or visible to humans and is thus able to record images, i.e., in particular a time sequence of images, preferably a plurality of images per second.

Real-time images are thus presently to be understood to be a time sequence of consecutively recorded images, which are displayed in real time or online on the display of the portable communication device. This means that a live video of at least one surrounding area of the motor vehicle is displayed on the display, which is recorded and imaged by means of the at least one camera.

Here as well, the entire logic or the entire image processing is preferably implemented in the on-board control device, and the function of the portable communication device is preferably limited to receiving the provided image data and displaying it on the display.

Real-time images are preferably displayed on the display of the portable communication device which depict a top view of at least one area of the motor vehicle, in particular the entire motor vehicle, and of a surrounding area, in particular the entire surroundings around the motor vehicle. Such a top view from an aerial perspective is also referred to as a 'bird's-eye view'. This may, for example, be such that the on-board control device calculates such an image from the image data of the cameras and transmits this image to the portable communication device. However, it may alternatively also be provided that the image data is transmitted without processing to the portable communication device, and the portable communication device then generates an image which shows the top view. However, as already indicated, it is advantageous if this logic is implemented in the on-board control device. On the basis of such a top view, the operating person is able to recognize the obstacles present in the surroundings of the motor vehicle even better and to better estimate the distances between the motor vehicle on the one hand and the obstacles on the other hand.

The portable communication device may be designed to scale and/or shift the real-time images displayed on the display. This scaling and/or shifting may be carried out automatically as a function of the place at which the user touches the display, i.e., for example, at the bottom or at the top. For example, if the display is touched at the top, this means that an upper area of the images would be obscured. In this case, the portable communication device may shift the displayed images downward in such a way that the entire motor vehicle or each relevant surrounding area is displayed in the area of the display which is still not obscured. It is also possible to carry out a user-defined scaling and/or shifting of the images via corresponding user inputs, i.e., by sweeping over the touch-sensitive display.

It may also be provided that the surrounding area is displayed enlarged on the display, or zooming is performed in the surrounding area in which an obstacle is located, with which a collision is imminent. In addition or alternatively, this area on the display may also be overshadowed by a predetermined colouring, for example, red. In this way, the relevant areas are emphasized.

A motor vehicle according to the present invention includes a manoeuvring system according to the present invention.

The present invention also relates to a portable communication device including an operating device and including a control unit which is designed to receive an input which a user carries out at the operating device and to transmit a command to a motor vehicle wirelessly based on this input, in order to enable and/or interrupt the carrying out of an automated manoeuvring operation of the motor vehicle. The portable communication device includes a loudspeaker and/or a haptic device, and the control unit may output an acoustic information signal including information about the manoeuvring operation by means of the loudspeaker and/or a haptic information signal including information about the manoeuvring operation by means of the haptic device, as a function of wirelessly received messages with respect to the manoeuvring operation of the motor vehicle.

A method according to the present invention is designed for the automated manoeuvring of a motor vehicle. Control signals are output to a drive device and/or steering device of the motor vehicle by means of an on-board control device, and a manoeuvring operation of the motor vehicle is thereby carried out automatically. A portable communication device communicates wirelessly with the on-board control device and may enable and/or interrupt the manoeuvring operation as a function of an input by a user to an operating device of the portable communication device. As part of the wireless communication, the on-board control device transmits messages to the portable communication device with respect to the manoeuvring operation, the portable communication device outputting an acoustic information signal including information about the manoeuvring operation by means of a loudspeaker and/or a haptic information signal including information about the manoeuvring operation by means of a haptic device, as a function of the received messages.

The present invention also includes a computer program which, when executed on a portable communication device, is designed to carry out the method according to the present invention or enables the carrying out of the method according to the present invention.

The preferred specific embodiments provided with reference to the manoeuvring system according to the present invention and their advantages correspondingly apply to the motor vehicle according to the present invention, the portable communication device according to the present invention, the method according to the present invention, and the computer program according to the present invention.

Additional features of the present invention result from the claims, the FIGURE and the description of the FIGURE. All features and combinations of features mentioned above in the description and the features and combinations of features mentioned below in the description of the FIGURE and/or shown below in the FIGURE itself are applicable not only in each specified combination, but also in other combinations or alternatively alone.

The present invention will now be described in greater detail based on a preferred exemplary embodiment and with reference to the appended drawings. At this point, it must be expressly emphasized that the exemplary embodiment below constitutes only one exemplary specific embodiment of the present invention, and the present invention is thus not limited to this exemplary embodiment.

FIG. 1 illustrates a schematic representation of a motor vehicle including a manoeuvring system according to one specific embodiment of the present invention.

FIG. 1 depicts a schematic representation of a motor vehicle 1 which is designed as a passenger car which includes a manoeuvring system 2 which is designed for carrying out an autonomous or completely automatic parking operation of the motor vehicle 1. The manoeuvring system 2 thus constitutes a parking assistance system in the exemplary embodiment. The manoeuvring system 2 includes an on-board control device 3 on the one hand and also a portable communication device 4 on the other hand. The control device 3 may, for example, include a microprocessor or digital signal processor and a transceiver unit via which the control device 3 of the motor vehicle 1 may communicate wirelessly with the portable communication device 4.

The control device 3 is electrically coupled to a drive device and steering device 5 of the motor vehicle 1, which is only schematically represented in the FIGURE. The drive device and steering device 5 includes all devices of the motor vehicle 1 required for carrying out a parking operation, in particular a drive train, a braking system and a steering device. The control device 3 may provide control signals S to the drive device and steering device 5 which cause the autonomous parking operation to be carried out.

The manoeuvring system 2 also includes sensors 6 which collectively form a sensor device and are arranged distributed on the motor vehicle 1. The sensors 6 are arranged such that parking spaces may be identified and detected without a problem. For example, a plurality of sensors 6 may be arranged on the front bumper of the motor vehicle 1, and a plurality of sensors 6 may also be attached to the rear bumper. The arrangement and the number of sensors 6 are only depicted by way of example in the FIGURE and may be different depending on the specific embodiment. The sensors 6 are in particular distance sensors, i.e., preferably ultrasound sensors and/or optical sensors and/or radar devices.

In addition to the sensors 6, the manoeuvring system 2 also includes a plurality of cameras 7 which are arranged distributed on the motor vehicle 1 and detect the entire surroundings around the motor vehicle in the exemplary embodiment. A camera 7 may be situated in the front area of the motor vehicle 1, for example, on the windscreen or on the front bumper. A camera 7 may be situated in the rear area, in particular on a rear bumper or on a tailgate. Cameras 7 may also be integrated into each of the rear-view mirrors.

Both the sensors 6 and the cameras 7 are electrically coupled to the control device 3. The image data recorded by the cameras 7 and the sensor data of the sensors 6 are transmitted to the control device 3.

As already indicated, the manoeuvring system 2 also includes the portable communication device 4, which is a smartphone in the exemplary embodiment. The portable communication device 4 includes a control unit in a known manner, which is not depicted in greater detail, i.e., a digital signal processor, and includes a touch-sensitive display 8 which has the function of an operating device on the one hand and also the function of an optical display device on the other hand. The portable communication device 4 also includes a transceiver device which is not depicted, which is designed for transmitting and receiving signals. The portable communication device 4 may thus communicate with the control device 3 of the motor vehicle 1 wirelessly and bidirectionally. This data transmission is preferably carried out according to the WLAN communication standard (Wi-Fi) or another suitable communication standard, in particular a standard having a comparatively low range.

As already indicated, the control device 3 may carry out an autonomous or completely automatic parking operation of the motor vehicle 1. After detecting a parking space with the aid of the sensors 6, the control device 3 calculates a parking path which the motor vehicle 1 must travel in order to reach a final position in the detected parking space. After calculating this parking path, the actual parking operation may then be started. A driver of the motor vehicle 1 may initiate this manoeuvring operation, i.e., with the aid of the portable communication device 4. That is to say, the communication device 4 may transmit a command 9 to the control device 3, on the basis of which the automatic parking operation is initiated. Thus, the driver may stand next to the motor vehicle 1 and observe this automatic operation from outside the motor vehicle 1. The driver also has the option at all times of interrupting the automatic parking operation. To do this, the driver must merely touch or release a predetermined contact surface of the display 8.

It is provided that the control device 3 transmits messages 10 to the portable communication device 4 including information about the manoeuvring operation. Based on these messages 10, a loudspeaker 11 of the portable communication device 4 and/or a haptic device 12 of the communication device 4 is then activated. The driver is thus informed of the manoeuvring operation with the aid of the loudspeaker 11 and/or the haptic device 12.

An acoustic information signal 13 may thus be output by means of the loudspeaker 11 in order to inform the driver of the details about the manoeuvring operation by acoustic means. Correspondingly, by means of the haptic device 12, which may include a vibrator, a haptic information signal 14 may be output which is a vibration signal, via which the portable communication device 4 is made to vibrate. The driver may thus also be informed by haptic means (perceptible through touch) about the details of the manoeuvring operation. The specific embodiment is presently preferred in which the information signals 13, 14 are already determined by the control device 3 of the motor vehicle 1, and control commands are transmitted with the messages 10 (data) to the portable communication device 4, by which the communication device 4 is triggered to output the particular information signal 13 or 14, in such a way as has already been determined by the control device 3. However, it may alternatively also be provided that only general information (such as distances) is transmitted to the portable communication device 4 in the messages 10, and the portable communication device 4 itself then determines the particular information signal 13 or 14.

Obstacles located in the surroundings of the motor vehicle 1 may be detected by the sensor device including the sensors 6, and the respective distances between the motor vehicle 1 and the obstacles may be measured. Each sensor 6 has its own detection area, so that obstacles located in different surrounding areas of the motor vehicle 1 may be detected separately and the distances may also be measured separately. For example, a distance d1 between the motor vehicle 1 and an obstacle 15 which is located in a left-hand surrounding area 16 of the motor vehicle 1, and also on the other hand, a distance d2 between the motor vehicle 1 and another obstacle 17 which is located in a right-hand surrounding area 18 of the motor vehicle 1, may be detected simultaneously. An acoustic information signal 13 may then be output by the portable communication device 4 in the form of a beeping sound, by means of which the driver is informed of the measured distances. At this point, a wide variety of specific embodiments may be may be provided. If the portable communication device 4 includes its own loudspeaker 11, the information signal 13 may be output for that obstacle 15, 17 with respect to which a calculated degree of danger is greatest. The directly measured distance d1, d2 or the so-called time to collision, which is also fundamentally related to the so-called distance to collision, may be used as a basis for the degree of danger. Unlike the direct distance d1, d2, the time to collision also takes into consideration the anticipated trajectory of the motor vehicle 1, which may be determined based on the current steering angle. The greater the time to collision, the lower is the degree of danger. If a built-in loudspeaker 11 is present, the information signal 13 is output at a certain point in time exclusively for one of the obstacles 15, 17, i.e., for that obstacle 15, 17 which is located closer to the vehicle 1 and/or for which the time to collision is the shortest.

However, it may alternatively be provided that the portable communication device 4 includes another loudspeaker 19 which forms a stereo loudspeaker system together with the loudspeaker 11. In this case, particular information signals 13, 20 may be output, each of which relates to a different obstacle 15, 17. Namely, an acoustic information signal 20 may be output using the left-hand loudspeaker 19, which informs of the distance d1 from the obstacle 15 which is located in the left-hand surrounding area 16. On the other hand, an acoustic information signal 13 may be output by means of the right-hand loudspeaker 11, by means of which the driver is informed of the distance d2 from the right-hand obstacle 17. It is possible to determine which of the two loudspeakers 19, 11 is activated as a function of where the particular obstacle 15, 17 is located with respect to a longitudinal axis of the vehicle (longitudinal centre axis). If the obstacle 15, 17 is located predominantly on the right-hand side of this longitudinal axis of the vehicle, the right-hand loudspeaker 11 is activated. Conversely, the left-hand loudspeaker 19 is then activated if an obstacle 15, 17 is detected on the left-hand side of this longitudinal axis.

With respect to the information signals 13, 20, different specific embodiments may also be provided which may also be combined with each other. Thus, the information signals 13, 20 may include an acoustic beeping sound, and thereby signal the respective distance via warning sounds which become faster until they become a continuous tone. The repetition frequency or repetition rate of these warning sounds is a function of the measured distance d1, d2, similarly to internal vehicle parking assistants. It may also be provided that, in addition to or alternatively to the directional information signals 13, 20, a different signal frequency (sound pitch) is used in each case as a function of the position of the obstacle 15, 17 relative to the motor vehicle 1, for example, relative to the aforementioned centre longitudinal axis. Thus, the driver may also be informed with only one loudspeaker 11 or 19 of the position of the obstacle 15, 17.

In addition or alternatively, the information signals 13 and/or 20 may also include speech signals, by means of which the driver is informed of the exact distances d1, d2 using speech. Such human speech signals may, for example, be designed in such a way as is already known in navigation systems. The driver may be informed via the speech signals of the distances d1, d2 from the obstacles 15, 17 and/or also of the remaining distance to the final position in the parking space and/or of the remaining time to reach the parking space.

The haptic information signal 14 may, for example, be used to signal the start of the manoeuvring operation and/or a braking of the motor vehicle 1 to the driver. Any movement of the motor vehicle 1 from a standstill during the manoeuvring operation may also be signalled using such a haptic information signal 14. If, for example, the motor vehicle 1 is also stopped during the manoeuvring operation due to an obstacle 15, 17, this may correspondingly also be signalled in advance using the haptic information signal 14. Reaching the final position in the parking space may also be signalled using such an information signal 14. Thus, the driver is effectively informed of all relevant actions during the manoeuvring operation.

The control device 3 may also generate the so-called 'bird's-eye view' from the image data of the cameras 7, i.e., real-time images which show the motor vehicle 1 and its surroundings from an aerial perspective. These top-view images may then be transmitted to the portable communication device 4 and displayed there on the display 8. The portable communication device 4 may then scale or zoom and/or shift the real-time images displayed on the display 8. This may also be carried out automatically as a function of the place at which the driver handles or touches the portable communication device 4. For example, if an area of the display 8 such as the upper area is obscured by the hand of the driver, the real-time image may be shifted to that area (for example, the lower area) of the display 8 which is not obscured by the driver. The entire relevant real-time image may be displayed, regardless of the place at which the driver holds the communication device 4. It is also possible to zoom into that surrounding area which is currently particularly relevant. This may be that surrounding area in which the obstacle 15, 17 having the greatest degree of danger is located. In addition or alternatively, this relevant surrounding area on the display 8 may be overshadowed with a predetermined colouring, for example, red. It is also possible to design the scaling and/or the shifting of the real-time images on the display 8 in a user-specific manner, i.e., via a suitable input on the touch-sensitive display 8. For example, the shifting of the images is carried out by simply sweeping over the display 8 in the desired direction, while the scaling of the image may be carried out by simply sweeping over the display 8 with two fingers in opposing directions.

The invention claimed is:

1. An autonomous manoeuvring system for the automated parking of a motor vehicle comprising:
    an on-board control device configured to provide control signals to a drive device and steering device of the motor vehicle and to carry out a manoeuvring operation of the motor vehicle automatically;
    a portable communication device operable by a user, the portable communication device being configured to communicate wirelessly with the on-board control device and to enable and interrupt the manoeuvring operation as a function of an input by the user at an operating device of the portable communication device; and
    an on-board sensor device for detecting a distance between the motor vehicle and an obstacle located in a surrounding area of the motor vehicle,
    wherein the on-board control device generates and transmits messages to the portable communication device based on the detected distance and with respect to the manoeuvring operation as part of the wireless communication, wherein the portable communication device outputs an acoustic information signal by a loudspeaker and a haptic information signal by a haptic device including information about the manoeuvring operation, as a function of the received messages, wherein the acoustic information signal output by the portable communication device is a signal which is a function of the distance with respect to its repetition frequency, wherein the sensor device detects distances between the motor vehicle and obstacles located in the surrounding areas, for at least two different surrounding areas of the motor vehicle, and the portable communication device outputs different acoustic information signals, and different haptic information signals, for the at least two different surrounding areas of the motor vehicle, and wherein the portable communication device includes a stereo loudspeaker system including at least a first and a second loudspeaker, and the sensor device detects distances between the motor vehicle and obstacles located in at least a first and a second surrounding area of the motor vehicle, wherein the portable communication device outputs an acoustic information signal via the first loudspeaker when an obstacle is present in the first surrounding area, and outputs an acoustic information signal via the second loudspeaker when an obstacle is resent in the second surrounding area.

2. The manoeuvring system according to claim 1, wherein the sensor device detects distances between the motor vehicle and obstacles located in the surrounding areas, for at least two different surrounding areas of the motor vehicle, and the portable communication device outputs the information signal for that obstacle which is closest to the motor vehicle and with respect to which a time until collision is the shortest.

3. The manoeuvring system according to claim 1, wherein the portable communication device outputs the acoustic and the haptic information signal at the start of the manoeuvring operation, as information about the imminent start of the manoeuvring operation.

4. The manoeuvring system according to claim 1, wherein the portable communication device outputs the acoustic and the haptic information signal when braking the motor vehicle, as information about the braking.

5. The manoeuvring system according to claim 1, wherein the acoustic information signal includes a speech signal including information about the manoeuvring operation.

6. The manoeuvring system according to claim 1, wherein the on-board control device determines, itself, the acoustic and haptic information signal to be output by the portable communication device, and to transmit a control command as messages to the portable communication device, in order to trigger the portable communication device to output the determined acoustic and haptic information signal.

7. The manoeuvring system according to claim 1, wherein the portable communication device is a mobile telephone.

8. A motor vehicle including a manoeuvring system according to claim 1.

9. A portable communication device, comprising:
an operating device;
a control unit that receives an input which a user carries out at the operating device, and to transmit a command to a motor vehicle wirelessly based on this input, in order to enable and interrupt the carrying out of an automated manoeuvring operation of the motor vehicle;

an on-board sensor device for detecting a distance between the motor vehicle and an obstacle located in a surrounding area of the motor vehicle, wherein the on-board control device generates messages for the portable communication device based on the detected distance, wherein the information signal output by the portable communication device is a signal which is a function of the distance with respect to its repetition frequency; and a loudspeaker and a haptic device, wherein the control unit outputs an acoustic information signal with respect to the manoeuvring operation of the motor vehicle by the loudspeaker and a haptic information signal by the haptic device including information about the manoeuvring operation, as a function of the messages wirelessly received, wherein the sensor device detects distances between the motor vehicle and obstacles located in the surrounding areas, for at least two different surrounding areas of the motor vehicle, and the portable communication device outputs different acoustic information signals, and different haptic information signals, for the at least two different surrounding areas of the motor vehicle, and wherein the portable communication device includes a stereo loudspeaker system including at least a first and a second loudspeaker, and the sensor device detects distances between the motor vehicle and obstacles located in at least a first and a second surrounding area of the motor vehicle, wherein the portable communication device outputs an acoustic information signal via the first loudspeaker when an obstacle is present in the first surrounding area, and outputs an acoustic information signal via the second loudspeaker when an obstacle is present in the second surrounding area.

10. A method for the automated manoeuvring of a motor vehicle, comprising:

providing, by an on-board control device, control signals to a drive device and steering device of the motor vehicle to carry out a manoeuvring operation of the motor vehicle automatically;

enabling and interrupting the manoeuvring operation as a function of an input by a user to an operating device of the portable communication device which wirelessly communicates with the on-board control device;

as part of the wireless communication, transmitting messages by the on-board control device to the portable communication device with respect to the manoeuvring operation;

outputting, by the portable communication device, an acoustic information signal including information about the manoeuvring operation by a loudspeaker and a haptic information signal including information about the manoeuvring operation by a haptic device of the portable communication device, as a function of the received messages, wherein the portable communication device comprises an on-board sensor device for detecting a distance between the motor vehicle and an obstacle located in a surrounding area of the motor vehicle, wherein the on-board control device generates and transmits the messages for the portable communication device based on the detected distance, wherein the acoustic information signal output by the portable communication device is a signal which is a function of the distance with respect to its repetition frequency, wherein the sensor device detects distances between the motor vehicle and obstacles located in the surrounding areas, for at least two different surrounding areas of the motor vehicle, and the portable communication device outputs different acoustic information signals, and different haptic information signals, for the at least two different surrounding areas of the motor vehicle, and wherein the portable communication device includes a stereo loudspeaker system including at least a first and a second loudspeaker, and the sensor device detects distances between the motor vehicle and obstacles located in at least a first and a second surrounding area of the motor vehicle, wherein the portable communication device outputs an acoustic information signal via the first loudspeaker when an obstacle is present in the first surrounding area, and outputs an acoustic information signal via the second loudspeaker when an obstacle is present in the second surrounding area.

* * * * *